United States Patent
Rao et al.

(10) Patent No.: US 8,242,051 B2
(45) Date of Patent: *Aug. 14, 2012

(54) CARBON SUPPORTED ACTIVATED ALUMINA ABSORBENT USEFUL FOR THE REMOVAL OF FLUORIDE IONS FROM WATER AND A PROCESS FOR THE PREPARATION THEREOF

(75) Inventors: Kamaraju Seeth Rama Rao, Hyderabad (IN); Veldurthi Shashikala, Hyderabad (IN); Aytam Hari Padmasri, Hyderabad (IN); Burri David Raju, Hyderabad (IN); Vasireddy Siva Kumar, Hyderabad (IN); Bhari Mallanna Naga Raja, Hyderabad (IN); Podila Seetha Ramulu, Hyderabad (IN); Sanapureddy Sreevardhan Reddy, Hyderabad (IN); Umesh Chandra Kulshreshta, Hyderabad (IN); Komandur Venkata Raghava Chary, Hyderabad (IN)

(73) Assignee: Council of Scientific & Industrial Research, New Delhi (IN)

( * ) Notice: Subject to any disclaimer, the term of this patent is extended or adjusted under 35 U.S.C. 154(b) by 295 days.

This patent is subject to a terminal disclaimer.

(21) Appl. No.: 11/537,747

(22) Filed: Oct. 2, 2006

(65) Prior Publication Data

US 2007/0210004 A1      Sep. 13, 2007

(30) Foreign Application Priority Data

Mar. 10, 2006 (IN) ............................ 0657/DEL/2006

(51) Int. Cl.
*B01J 20/00* (2006.01)
*B01J 20/20* (2006.01)
*C02F 1/42* (2006.01)
*B01D 24/00* (2006.01)

(52) U.S. Cl. ...... 502/415; 502/413; 210/681; 210/500.1

(58) Field of Classification Search .................. None
See application file for complete search history.

(56) References Cited

U.S. PATENT DOCUMENTS 4,795,735 A * 1/1989 Liu et al. ..................... 502/415

OTHER PUBLICATIONS

Wang et al.; Preparation of Alumina Supported on Carbon Nanotubes and its Application in Fluoride Adsorption From an Aqueous Solution; Chinese Science Bulletin; vol. 47, No. 9; May 2002).*
L.R. Puka; Thesis, University of Johannesburg; Aug. 17, 2004.*
Ghorai et al.; Equilibrium Kinetics and Breakthrough Studies for Adsorption of Fluoride on Activated Alumina; Separation Purification Technology; 42, pp. 265-271; 2005).*

* cited by examiner

*Primary Examiner* — Melvin C Mayes
*Assistant Examiner* — Guinever Gregorio
(74) *Attorney, Agent, or Firm* — Foley & Lardner LLP

(57) ABSTRACT

The present invention provides a novel adsorbent carbon supported activated alumina (CSAA) which posses both the advantageous characteristics of carbon and alumina viz., the high specific surface area associated with activated carbon and high sorption capacity of alumina towards $F^-$ Carbon supported activated alumina has an added advantage of its usage in the neutral pH unlike alumina and alumina impregnated carbon which are found to be efficient only in acidic pH. It is more efficient compared to carbon in terms of its sorption capacity towards $F^-$ and is therefore useful for the efficient removal of fluoride ions from water.

3 Claims, No Drawings

(12) United States Patent US 8,242,051 B2

CARBON SUPPORTED ACTIVATED ALUMINA ABSORBENT USEFUL FOR THE REMOVAL OF FLUORIDE IONS FROM WATER AND A PROCESS FOR THE PREPARATION THEREOF

CROSS-REFERENCE TO RELATED PATENT APPLICATIONS

India Priority Application 0657/DEL/2006, filed Mar. 10, 2006 including the specification, drawings, claims and abstract, is incorporated herein by reference in its entirety.

BACKGROUND OF THE INVENTION

The present invention relates to a carbon supported activated alumina adsorbent useful for the removal of fluoride ions from water. The present invention also relates to a process for the preparation of carbon supported activated alumina adsorbent useful for the removal of fluoride ions from water.

BACKGROUND OF THE INVENTION

Even though water is abundantly available on the earth in the form of oceans, lakes, rivers etc., only a little portion is fit for drinking purposes. Hence, most of the rural population depends on the ground water. The poor quality of ground water makes the people to suffer due to different diseases. The problem of excessive fluorides in drinking water is a matter of serious concern around the world. Fluoride as low as 1 ppm (mg\L) causes breakdown of collagen, the most abundant of the body's protein at 30%. The concentration above 2 ppm gives permanent teeth a chalky-white appearance or the mottled brown-satin coloration to children less than 10 years of age. Fluoride above 4 ppm in drinking water can cause a condition of dense and brittle bones, known as osteoporosis, or marble bones called skeleton fluorosis. Fluoride replaces hydroxides in bones and thus is deposited in bones and causes chronic effect, known as skeleton fluorosis. The acceptable limits of fluoride ion in drinking water according to W.H.O. is 1.5 mg/litre of water. Hence it is utmost important to purify the water before its use by Adsorption technology for removal of fluoride ion from water is one of the commercially viable technology.

The present invention provides a process for the preparation of carbon supported activated alumina adsorbent useful for removal of fluoride ion from water.

An invention relating to a process in removing fluoride ion from waste water from silicon processing, through neutralization was disclosed in a U.S. Pat. No. 6,436,297. This invention highlights the method based on physicochemical processing for the removal of F⁻ form water using milk of lime (Ca(OH)$_2$ suspended in water) which is based on the spontaneous precipitation in the form of calcium fluoride (CaF$_2$) of the fluoride ions in the presence of calcium ions following the equation:

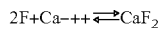

$2F + Ca^{++} \rightleftharpoons CaF_2$

Reference may be made to another U.S. Pat. No. 2,059,553 discloses the removal of fluoride by adsorption process on the activated alumina in presence of alkali metals. The pH of the water is maintained at 4-8. Reference may be made to yet another U.S. Pat. No. 2,043,705 gave a comparative study of the adsorption properties of the hydroxides of aluminium, iron, zinc and manganese based on the precipitation method. Among all aluminium hydroxide is observed as the best. A publication by A. M. Raichur in separation and purification Technology (24 (2001) 121-127), explained about the removal of F⁻ using rare earth oxides. Another publication by R. H. Mc kee in Industrial Engineering chemistry (26 (1934) 849) reveals the defluoridation by active carbon. Yet another reference may be made to a publication on defluoridation by R. Leyva Ramos, et al in Carbon (37 (1999) 609-619), which reports the use of Al impregnated on activated carbon using aluminum nitrate precursor. This catalyst adsorbs F⁻ in acidic condition (i.e. pH-3).

The main limitations of the above mentioned patents and publications are:
1. Adsorption processes requires acidic conditions.
2. Addition of alkali metal ions for best adsorption.
3. In the precipitation method the separation of the pure water is a tedious process and there is no recovery of the catalyst.

On the contrary, the present invention highlights the very simple way of making a highly efficient adsorbent for removal of fluoride ion without using alkali metal ions and easy way of operation i.e., in neutral pH-conditions.

OBJECTIVES OF THE INVENTION

The main object of the present invention is to utilize the combined characteristics of alumina and carbon prepared through a deposition-precipitation route.

Another object of the present invention is to prepare carbon supported activated alumina wherein the activated alumina precursor is selected from aluminum nitrate and the precipitating agent is selected from ammonia solution.

Yet another object is to provide a process for the removal of high F⁻ levels in the drinking water by using carbon supported activated alumina, as absorbent.

Still another object is to provide a process wherein the defluoridation step can be performed at neutral $p^H$.

SUMMARY OF THE INVENTION

Accordingly the present invention provides a novel carbon supported activated alumina absorbent comprising carbon content in the range of 1-80 wt %.

In an embodiment of the present invention the absorbent has carbon content in the range of 5-50 wt %.

In yet another embodiment the absorbent has carbon content preferably in the range of 5-25 wt %.

In yet another embodiment the absorbent carbon supported activated alumina is useful for the removal of fluorides ions from water.

The present process further provides a process for the preparation of carbon supported activated alumina absorbent useful for the removal of fluoride ions from water, which comprises adding activated carbon powder to an aqueous solution of 10-15 wt % of aluminum nitrate, followed by precipitation of the resultant solution mixture by adding drop wise about 5% ammonia solution, under stirring, until pH of the solution mixture reaches to a value of about 10, filtering the above said reaction mixture to obtain the aluminum hydroxide deposited activated carbon and washing it with water repeatedly till the filtrate reaches to a neutral pH value, and drying it at a temperature of 100-130° C., for a period of about 24 hrs, followed by calcination at a temperature of 300-400° C., for a period of 2-5 hrs, under nitrogen atmosphere, activating the above said calcined aluminum hydroxide deposited activated carbon crystals with aluminum sulphate by soaking it in about 3% aqueous solution of aluminum sulphate, for a period of about 1 hr, followed by decantation and washing with water till the decant bring to neutral pH, drying the resultant product, at a temperature in the range of 100-130° C., for a period of about 4 hrs to obtain the desired product of carbon supported activated alumina.

In yet another embodiment the temperature used for the calcination of aluminum hydroxide deposited activated carbon is in the range of 350-380° C.

In yet another embodiment the temperature used for drying product is in the range of 120-130° C.

In yet another embodiment the carbon supported activated alumina obtained has carbon content in the range of 5-50 wt %, preferably in the range of 5-25 Wt %.

The present process further provides a process for the removal of fluoride ions from water using carbon supported activated alumina absorbent which comprises contacting fluoride ions containing water with a carbon supported activated alumina absorbent, at a neutral pH, at a temperature of 20-30° C., for a period of 1-24 hrs to obtain the fluoride ions depleted water.

A. In yet another embodiment the carbon supported activated alumina absorbent used is taken in a fixed bed reactor.

In yet another embodiment the fluoride ions containing water used is continuously passed over the carbon supported activated alumina.

In yet another embodiment the carbon supported activated alumina absorbent used has carbon content in the range of 5-50 wt %, preferably 5-25 Wt %.

In yet another embodiment the carbon supported activated alumina having 25 wt % carbon content used shows a maximum fluoride ions adsorption capacity of 98.7 wt % after contacting time period of 1 hr between the fluoride ions containing water and absorbent.

In yet another embodiment the carbon supported activated alumina having 25 wt % carbon content used shows a fluoride ions adsorption capacity of 98.3 wt % after contacting period of 5 hrs between the fluoride ions containing water and absorbent.

In yet another embodiment the carbon supported activated alumina having 25 wt % carbon content used shows a fluoride ions adsorption capacity of 92.4 wt % after a contacting period of 6 hrs between the fluoride ions containing water and absorbent.

In still another embodiment the carbon supported activated alumina having 50 wt % carbon content shows a fluoride ions adsorption capacity of 91.4 wt % after a contacting period of 6 hrs between the fluoride ions containing water and absorbent

DETAIL DESCRIPTION OF THE INVENTION

Activated alumina can be applied as a successful defluoridation medium. Out of the several advantages associated with the usage of alumina, its specificity for $F^-$ and a relatively high exchange capacity of this ion are the major ones for it to acts as an efficient defluoridation material. The mechanism behind its action is chemisorption where activated alumina acts as an anianite, charged with $SO_4^{2-}$ ions. During the processes of activation of alumina with aluminum sulphate, the formation of a complex-ligand takes place in the initial stage which then acts as an anion exchanger in the next stage for the removal of $F^-$ by the exchange of $SO_4^{2-}$ with $F^-$. Further, the sorption capacity of the material may be restored by using a regeneration solution like NaOH.

The common adsorbents viz., carbon and alumina have certain advantages and drawbacks in terms of their performance towards the removal of fluoride.

The present report discloses the use of a novel adsorbent carbon supported activated alumina (CSAA) which posses both the advantageous characteristics of carbon and alumina viz., the high specific surface area associated with activated carbon and high sorption capacity of alumina towards $F^-$. Carbon supported activated alumina has an added advantage of its usage in the neutral pH unlike alumina and alumina impregnated carbon which are found to be efficient only in acidic pH. It is more efficient compared to carbon in terms of its sorption capacity towards $F^-$. However the working principle of CSAA is similar to that of alumina but more efficient and works even in the neutral pH. The advantage of carbon supported activated alumina is the formation smaller activated alumina crystallites on the carbon. Activated alumina is better dispersed on activated carbon because activated carbon is a high surface area material.

The following examples are given by the way of illustration and therefore should not be construed to limit the scope of the invention

Example-1

A series of carbon supported activated alumina with varying carbon loading 5 to 50 wt. %, are prepared by deposition precipitation method. Finely powdered activated carbon is added to the aqueous solution containing requisite amount of 10% aluminum nitrate by weight. It is precipitated with 5% ammonia solution by adding drop-wise slowly under vigorous stirring conditions until the pH reaches to a value of 10. The precipitated aluminum hydroxide deposited on activated carbon is filtered with thorough washings until the pH of the filtrate reaches to neutral. These precipitates are kept for drying at 120° C. for over night in the oven. The dried catalysts are calcined at 350° C. for 3 h under nitrogen atmosphere. These calcined catalysts are activated with aluminum sulphate. 10 gm catalyst is soaked in a 100 ml of 3% aluminum sulphate solution for 1 h followed by decantation and washings thoroughly with deionised water to bring the neutral pH. The catalysts are dried for 4 h in oven at 120° C. The catalysts thus prepared are ready for the reaction. The catalyst with carbon contents of 5%, 15%, 25% and 50% by weight are designated as CSAA 5, CSAA 15, CSAA 25 and CSAA 50 respectively.

Example-2

The defluoridation ability of the three catalysts, two are commercially available alumina (obtained from M/S Sude Chemie, India) and activated carbon (Source: Norrit obtained from M/S, Fluka, Netherlands) and the other is CSAA 25 as prepared in Example-I are shown in Table-1. The fluoridated water with $F^-$ concentration of 20 ppm is prepared by dissolving requisite amount of NaF in deionized water. The 20 ppm $F^-$ containing water is passed continuously over the catalyst of 1 gram, taken in a fixed bed glass reactor (10 mm diameter and 200 mm long). The concentration of the fluoride ion present in the out let water after 5 h is analyzed using a Advanced Ion-Chromatograph (M/S, Metrohm Switzerland) with conductivity detector and with anion column Sup-5 and mixture of aqueous solution containing sodium carbonate and bicarbonate. It is clearly observed that the catalyst prepared in the Example-I is the best adsorbent among the three adsorbents. The fluoride adsorption capacity of CSAA 25 as prepared in the Example-I is twice than that of the $\gamma$-$Al_2O_3$ and is approximately 25 times more active than activated carbon which is given in the Table-1.

TABLE 1

Comparison of Defluoridation capabilities of γ-Al₂O₃, Activated carbon and Carbon Supported Activated Alumina (CSAA 25)

| Sl. No. | Catalyst | Time at which Fluoride ion concentration measured | F− absorption capacity (% by weight) |
|---|---|---|---|
| 1 | γ-Al₂O₃ | 5 h | 48.5 |
| 2 | Activated carbon | 5 h | 4.0 |
| 3 | Carbon Supported Activated Alumina (CSAA 25) | 5 h | 98.3 |

Example-3

The F⁻ adsorption capacities of different samples of activated alumina with varying compositions of carbon are listed in Table-2. A flow of 20 ppm F⁻ water is passed continuously over the catalysts CSAA 5, CSAA 15, CSAA 25 and CSAA 50 separately and the concentration of F⁻ at the out let after 6 h, is analyzed by advanced ion-Chromatograph with conductivity detector and with anion column Sup-5 and mixture of aqueous solution containing sodium carbonate and bicarbonate. The increase in carbon content up to 50 wt % by weight enhanced the adsorption capacity.

TABLE 2

Comparison of Defluoridation capabilities of Carbon Supported Activated Alumina with different alumina compositions

| Sl. No | Catalyst | C Composition (% by weight) | Time at which Fluoride ion concentration measured | F− absorption capacity (% by weight) |
|---|---|---|---|---|
| 1 | CSAA 5 | 5 | 6 h | 39.9 |
| 2 | CSAA 15 | 15 | 6 h | 40.9 |
| 3 | CSAA 25 | 25 | 6 h | 92.4 |
| 4 | CSAA 50 | 50 | 6 h | 91.4 |

Example-4

The defluoridation capability of CSAA 25 at regular internals is listed in the Table-3. The 20 ppm F⁻ containing water is passed continuously over the catalyst of 1 gram, taken in a fixed bed glass reactor (10 mm diameter and 200 mm long). The concentration of the fluoride ion present in the out let water at regular intervals is analyzed using an Advanced Ion-Chromatograph with conductivity detector and with anion column Sup-5 and mixture of aqueous solution containing sodium carbonate and bicarbonate. The data explains the excellent defluoridation capability of CSAA 25.

TABLE 3

Defluoridation capability of Carbon Supported Activated Alumina (CSAA 25) against time on stream

| Sl No | Time at which Fluoride ion concentration measured | F⁻ at outlet (ppm) | F⁻ absorption capacity (% by weight) | Cumulative Weight of Absorbed F⁻ (mg/g catalyst) |
|---|---|---|---|---|
| 1 | 1 h | 0.19 | 98.7 | 0.44 |
| 2 | 5 h | 0.26 | 98.3 | 2.22 |
| 3 | 10 h | 3.70 | 75.3 | 3.88 |
| 4 | 15 h | 10.16 | 32.3 | 4.99 |
| 5 | 25 h | 10.41 | 30.6 | 6.45 |

We claim:

1. An activated carbon supported activated alumina adsorbent comprising:
    an activated carbon support onto which alumina is adsorbed;
    wherein the activated carbon supported activated alumina adsorbent has an activated carbon content in the range of 25-50 wt %;
    wherein the alumina adsorbed onto the carbon support is not activated prior to adsorption, but is activated after adsorption onto said support and prior to use of said adsorbent; and
    wherein the fluoride ion adsorption capacity of said activated carbon supported activated alumina adsorbent is in a range of 91.4 wt % to 92.4 wt % after a contacting period of 6 hours between the fluoride ions containing water and absorbent.

2. An adsorbent as claimed in claim 1, wherein the carbon content is 25 wt %.

3. An adsorbent as claimed in claim 1, wherein the adsorbent is brought in contact with water containing fluoride ions to remove said ions from water.

* * * * *

UNITED STATES PATENT AND TRADEMARK OFFICE
CERTIFICATE OF CORRECTION

| | | |
|---|---|---|
| PATENT NO. | : 8,242,051 B2 | Page 1 of 1 |
| APPLICATION NO. | : 11/537747 | |
| DATED | : August 14, 2012 | |
| INVENTOR(S) | : Kamaraju Seeth Rama Rao et al. | |

It is certified that error appears in the above-identified patent and that said Letters Patent is hereby corrected as shown below:

On the Title page, item (54), should read:

NOVEL CARBON SUPPORTED ACTIVATED ALUMINA ABSORBENT USEFUL FOR THE REMOVAL OF FLUORIDE IONS FROM WATER AND A PROCESS FOR THE PREPARATION THEREOF

Signed and Sealed this
Thirtieth Day of October, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,242,051 B2 | Page 1 of 1 |
| APPLICATION NO. | : 11/537747 | |
| DATED | : August 14, 2012 | |
| INVENTOR(S) | : Kamaraju Seeth Rama Rao et al. | |

It is certified that error appears in the above-identified patent and that said Letters Patent is hereby corrected as shown below:

<u>Title Page,</u>
Item [54], Title, the word "NOVEL" (as inserted by Certificate of Correction issued October 30, 2012) should be deleted and title is reinstated to read
--CARBON SUPPORTED ACTIVATED ALUMINA ABSORBENT USEFUL FOR THE REMOVAL OF FLUORIDE IONS FROM WATER AND A PROCESS FOR THE PREPARATION THEREOF--.

Signed and Sealed this
Fourth Day of December, 2012

David J. Kappos
*Director of the United States Patent and Trademark Office*